May 22, 1934.    E. J. GOHR ET AL    1,960,207
PROCESS FOR TREATING HYDROCARBONS
Filed Feb. 2, 1931
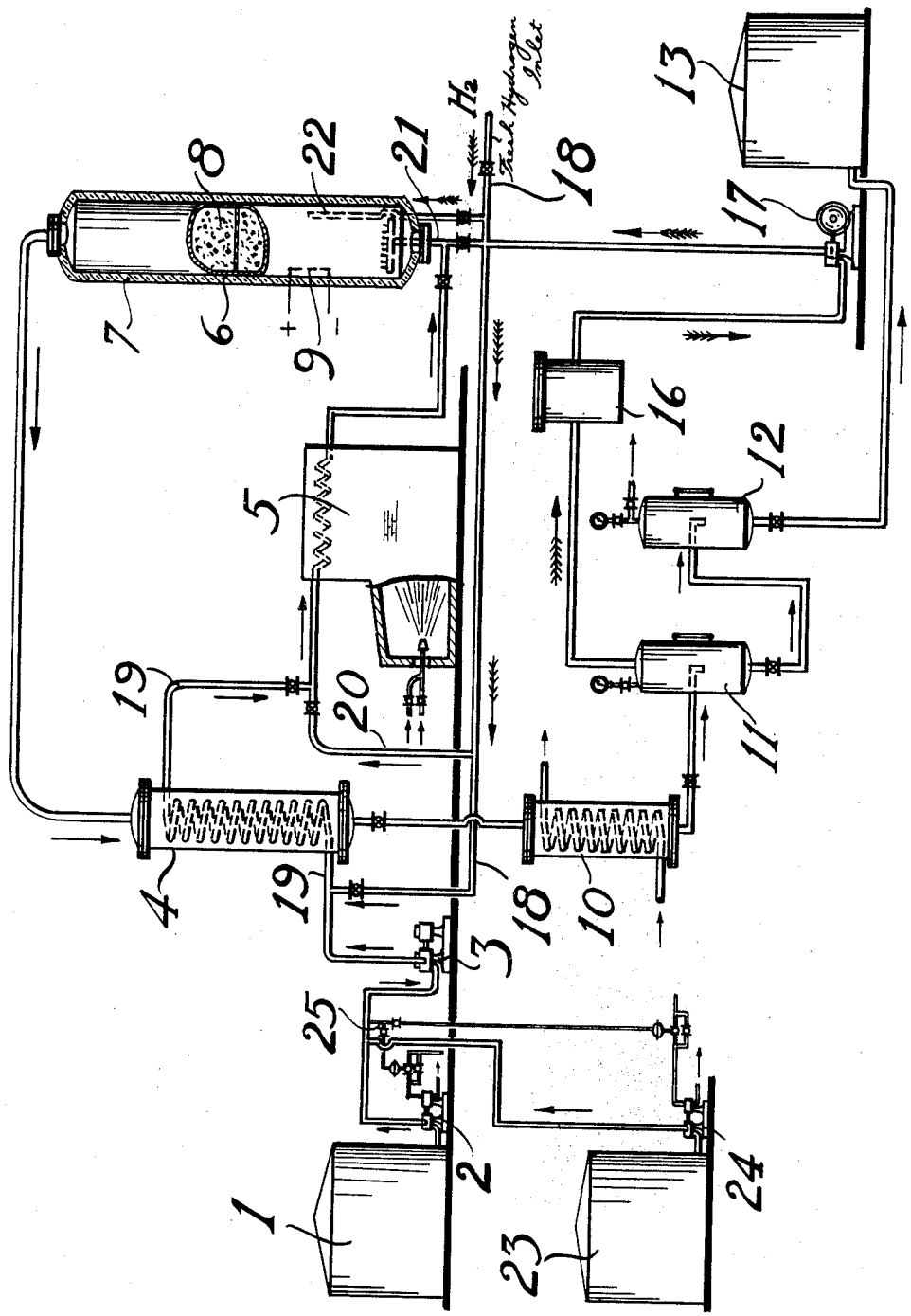
Edwin J. Gohr  Inventors
Robert C. Cline
W. E. Currie  Attorney Patented May 22, 1934

1,960,207

UNITED STATES PATENT OFFICE 1,960,207

PROCESS FOR TREATING HYDROCARBONS

Edwin J. Gohr, Elizabeth, N. J., and Robert C. Cline, Baker, La., assignors to Standard-I. G. Company Application February 2, 1931, Serial No. 512,801

6 Claims. (Cl. 196—53)

This invention relates to improvements in the treatment of hydrocarbon oils at high temperatures and in particular to an improved method or procedure for use when changes in operation from vapor phase to liquid phase or the reverse, are desired. Our invention will be fully understood from the following description and the drawing which illustrates one method of operation.

This invention is especially applicable to the high pressure hydrogenation of oils. During normal operation for the production of high quality kerosenes from hydrocarbons boiling substantially in the kerosene range, the material being treated is substantially in vapor form in those parts of the apparatus maintained at the highest temperatures. When changing from this method of operation to the production of a high quality lubricating oil from heavy petroleum fractions, a period of time occurs during which no product is secured. This period is accompanied by violent fluctuations in temperatures and pressures throughout the equipment, resulting in the production of off-quality stocks and consequent loss in operating time on production of high quality products. By our improved process a method of operation has been discovered that causes none of these undesirable fluctuations and permits safe and steady control of the operation at all times during such changes.

The drawing represents a high pressure hydrogenation system which may be used for the production of high quality kerosenes or lubricating oils. Crude kerosenes or unrefined hydrocarbon distillates boiling in the range between gasolines and lubricating oils are withdrawn from tank 1 by low pressure pump 2 and supplied at an intermediate pressure of say 50 pounds per square inch to high pressure pump 3. This pump operates usually at constant rates for each type of operation, and forces the oil through heat exchanger 4 and a heating means represented by fired coil 5 into the bottom of a high pressure reaction vessel 6. This vessel is preferably covered with an insulating layer 7 and is usually filled with a suitable catalytic material 8. The vessel may be maintained at the desired reaction temperature entirely by the heat of the reaction of the constituents therein and by the heat supplied from coil 5, or it may be heated interiorly by suitable means as by electrical heaters 9.

The reaction products leaving vessel 6 pass in counter current heat exchange with the entering mixture in exchanger 4 and are then further cooled and condensed in cooler 10. The condensed liquid and undissolved gas are separated in a separator 11 operated usually at system pressure. The liquid from this separator is released to atmospheric pressure in a second separator 12 and is then removed to suitable storage tanks 13. The gas from separator 12 may be processed in light hydrocarbon recovery plants, or it may be used as fuel or for other means as desired.

The gas released in separator 11 is ordinarily passed through a purification apparatus shown generally by 16 in which sulfur compounds, hydrocarbons and other impurities are removed. The purified gas consisting largely of hydrogen is forced back to system inlet pressure by compressor 17 and is mixed in line 18 with fresh hydrogen supplied at the desired pressure from any convenient source. This hydrogen is then mixed with the oil going to exchanger 4 in pipe 19 or a part of it may be supplied at the coil inlet through pipe 20 or to the reaction vessel through pipes 21 and 22.

Tank 23 represents a second storage system from which heavy hydrocarbon fractions such as low quality lubricating distillates may be supplied through pump 24 to the hydrogenation apparatus as already described. Pumps 2 and 24 may be operated by a constant pressure control system 25 which is connected to the suction side of pump 3 and through sylphon bellows operated needle valves to the steam supply to each of pumps 2 and 24. The use of this control system will be described in connection with the improved method of operation herein disclosed.

In our improved method of operation it is desirable to effect the change in the feed stock from kerosene distillates to heavy oils over an extended period of time. The composition of the feed stock may be changed by gradually decreasing the amount of the supply of light distillate and increasing the supply of heavy oils so as to prevent sudden changes in the composition or total rate of feed to the system. In changing from one type of operation to another it is preferred to make any necessary changes in the total pumping rate during the same time that the composition of the feed is being changed. These changes may also be made in a series of steps which approximate the same result. The variation in the rate of supply of light and heavy feed stocks may be controlled entirely by hand operation or by mechanical or electrical flow control attached to pumps delivering the respective stocks.

A gradual change in composition of the feed stock may be easily and simply secured by means of a small feed tank containing two to four hours supply of oil for the system, and situated as a surge tank between the feed stock storage and the high pressure feed pumps. At the start of the change this tank contains only the type of feed being treated in the system. The supply of oil to the tank is shifted abruptly to the new stock to be treated, and the contents of the tank are kept in agitation by suitable paddles, or oil may be recirculated from the bottom to the top of the tank by a special pump, or by other means providing constant and thorough mixing. The feed to the system from this tank then consists of a smoothly varying blend of the two feed stocks until the first stock has been entirely displaced by the second. Other well known methods of blending the feed stocks may be used provided the change is made so gradually that the operation of the high pressure apparatus is not disturbed.

Our preferred method of operation, as shown in the drawing, is to use low pressure feed pumps which supply the feed stocks at constant pressure to the suction of the high pressure feed pump. The pump supplying the light distillate may then be connected with a constant pressure regulator by which this pump is regulated to supply only enough oil to hold a constant pressure before the high pressure feed pump. Then if a gradually increasing amount of heavy oil is supplied to the same line from a second pump regulated by hand control the amount of light distillate will be automatically decreased at a rate corresponding to the increase in the supply of the heavy oil.

The advantages of our method of operation are shown in the following example. The feed stock of a high pressure system operating on kerosene is abruptly changed to a heavy lubricating oil fraction. The coil outlet temperature drops from 660 to 605° F., the coil inlet temperature drops from 600 to 440° F., and the system pressure rises from 3000 to 3300 pounds per square inch as a result of the change, and products of an inferior quality are produced until normal operating conditions are regained. The same change in feed stocks may be made in the same apparatus using our improved method of gradually changing the composition of the feed stock by the following procedure: Lubricating oil fractions are added to the feed stocks in small increments of about 5% each ten to fifteen minutes, simultaneously decreasing the supply of kerosenes, so that at the end of the first hour the feed stock is changed to include 25% of heavy lubricating oil fractions and 75% of the kerosenes. At the end of the second hour the proportion of each is 50%. At the end of the third hour the feed stock contains 75% lubricating oil fractions and at the end of the fourth hour only lubricating oil fractions are supplied to the system. No change in system temperatures or pressures or decreases in the quality of the product results and constant control of the operation is easily maintained throughout the change.

Our method applies equally well to all changes in feed stocks which involve changes in boiling range or hydrogenation characteristics of the stocks treated. Oils of approximately the same boiling range, but possessing different hydrogenation characteristics, may differ widely in their respective ease of hydrogenation, or in the heat effect attending their hydrogenation.

Our method also applies to changes in the composition of blended feed stocks such as mixtures of fresh oils with fractions of previously hydrogenated oils.

It is understood that the length of time required for making a change in feed stocks will vary widely according to the difference in the hydrogenation characteristics or boiling range of the two stocks. Where stocks are closely similar in these respects the change may be made very rapidly without disturbing the operation of the hydrogenation unit, and the new stock may be substituted for the old at rates of about 10% each ten to fifteen minutes, or even more rapidly. On the other hand, where the two stocks differ widely in their hydrogenation characteristics or boiling range, it is preferable to bring about the change very slowly, and rates of substitution below about 2% each ten to fifteen minutes may be used. In changing the feed stocks to hydrogenation units operating at high temperature above about 900° F. it is sometimes desirable to first reduce the temperature of the reactor to about 850° F. or lower, and to operate at this reduced temperature until the change is well under way, or substantially completed, when the higher temperature may be resumed.

In changes from heavy to light feed stocks which involve a change from liquid to vapor phase operation, it is desirable that no unvaporized heavy hydrocarbons be allowed to remain in the vapor phase zone. This is especially important when the liquid phase operation was conducted on tars, heavy asphaltic crudes and similar stocks containing non-vaporizable or difficultly vaporized constituents. When such stocks are used it is preferable to use an intermediate stock such as a heavy gas oil, hydrogenated cycle stock or light lubricating oil distillate which remains substantially in the liquid phase when in mixture with the heavier stocks or alone in the system, and which is vaporized on addition of still lower boiling stocks. The feed may then be changed practically abruptly from the heavy stock to the intermediate oil, and this oil is supplied for one to three hours until the residual heavier constituents are washed from the high temperature zone. The change from the intermediate to the lower boiling stock is then made as already described according to our usual method of operation.

Our invention is not to be limited by any theory of the mechanism of the reactions nor to any specific example which may have been given for purposes of illustration, but only by the following claims in which we wish to claim all novelty inherent in this invention.

We claim:

1. In a process for the hydrogenation of hydrocarbon oils at elevated temperatures and pressures of the range employed in destructive hydrogenation an improved method for making changes in the feed stocks of types characterized by different degrees of intensity of heat evolution on reaction while reaction conditions are continuously maintained and controlled and the quality of the product is not decreased, which comprises gradually substituting increasing amounts of the new stock for the stock being treated, the rate of substitution of the new stock for the old stock being below about 10% each ten to fifteen minutes whereby abrupt changes in composition of feed stock are prevented and the new stock is finally substituted completely for the old.

2. Process according to claim 1 in which a heavier oil is substituted for a lighter oil at a rate of about 5% each ten to fifteen minutes.

3. Process according to claim 1 in which the two stocks differ widely in hydrogenation and heat evolving characteristics, and the rate of substitution of the new stock for the old is below about 2% each fifteen minutes.

4. An improved process for destructively hydrogenating a lower boiling hydrocarbon oil in an apparatus which has been operating at high temperature and pressure of range employed for destructive hydrogenation on a higher boiling hydrocarbon oil containing pitch, tars, or other gummy and difficultly volatile material which comprises substituting an intermediate wash oil which is substantially in liquid phase at the operating conditions of the hydrogenation apparatus, feeding this oil for two to four hours, then adding the lower boiling oil in gradually increasing amounts to the feed stock, simultaneously decreasing the rate of supply of the intermediate wash oil, whereby the composition of the feed stock is finally changed entirely to that of the lower boiling oil without abrupt changes in the operation of the apparatus.

5. Process according to claim 4 in which the intermediate wash oil is a heavy cycle stock.

6. Process according to claim 4 in which the intermediate wash oil is a heavy oil distillate.

EDWIN J. GOHR.
ROBERT C. CLINE.